United States Patent
Bieber

(10) Patent No.: US 9,283,636 B2
(45) Date of Patent: Mar. 15, 2016

(54) JOINING DEVICE FOR JOINING TWO WORKPIECES HAVING EITHER A PIVOTABLE STAMP OR A PIVOTABLE SUPPORTING TABLE

(75) Inventor: Reinhard Bieber, Rohr (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 1071 days.

(21) Appl. No.: 13/379,183

(22) PCT Filed: Jun. 18, 2010

(86) PCT No.: PCT/EP2010/003694
§ 371 (c)(1),
(2), (4) Date: Feb. 28, 2012

(87) PCT Pub. No.: WO2010/149314
PCT Pub. Date: Dec. 29, 2010

(65) Prior Publication Data
US 2012/0145330 A1    Jun. 14, 2012

(30) Foreign Application Priority Data
Jun. 22, 2009  (DE) .......................... 10 2009 030 115

(51) Int. Cl.
*B32B 37/00* (2006.01)
*B23K 20/10* (2006.01)
(Continued)

(52) U.S. Cl.
CPC ............... *B23K 20/10* (2013.01); *B23K 20/106* (2013.01); *B29C 65/02* (2013.01); *B29C 66/1122* (2013.01); *B29C 66/4724* (2013.01); *B29C 66/8163* (2013.01); *B29C 66/82421* (2013.01); *B29C 66/8322* (2013.01); *B29C 66/929* (2013.01); *B29C 66/9221* (2013.01); *B29C 66/92445* (2013.01); *B29C 66/92451* (2013.01);
(Continued)

(58) Field of Classification Search
CPC ........ B23K 20/10; B29C 65/02; B29C 65/08; B29C 65/18
USPC ............. 156/379.6, 380.6, 380.8, 580, 580.1, 156/580.2, 581, 583.1; 100/258 R, 258 A
See application file for complete search history.

(56) References Cited

U.S. PATENT DOCUMENTS 3,661,661 A    5/1972   Berleyoung
4,784,058 A *  11/1988  Nakagawa et al. ............. 100/35
(Continued)

FOREIGN PATENT DOCUMENTS

DE          19917133       11/2000

*Primary Examiner* — James Sells
(74) *Attorney, Agent, or Firm* — Hoffmann & Baron, LLP

(57) ABSTRACT

There is described a joining device (1) comprising a stamp which can be moved up and down between a lower working position and an upper loading position. For example a hot embossing film (14) and a substrate (13) arranged under the hot embossing film (14) can be arranged between the stamp and the support table (12). The support table (12) is mounted pivotably about two pivot axes which are perpendicular to each other and which are perpendicular to the axis of movement of the stamp (11) and is pivotable by means of adjusting devices (18) about the two pivot axes, wherein the stamp (11) forms a rigid support in the working position. Alternatively the stamp (11) is mounted pivotably about two pivot axes which are perpendicular to each other and which are perpendicular to the axis of movement of the stamp (11) and is pivotable by means of adjusting devices (18) about the two pivot axes, wherein the support table (12) forms a rigid support in the working position.

19 Claims, 5 Drawing Sheets

(51) Int. Cl.
    *B29C 65/00*     (2006.01)
    *B30B 15/00*     (2006.01)
    *B41F 19/06*     (2006.01)
    *B29C 65/02*     (2006.01)
    *B29C 65/04*     (2006.01)
    *B29C 65/08*     (2006.01)
    *B29C 65/18*     (2006.01)
    *B29L 31/00*     (2006.01)

(52) U.S. Cl.
    CPC ......... *B29C 66/92655* (2013.01); *B30B 15/007* (2013.01); *B41F 19/068* (2013.01); *B23K 2201/16* (2013.01); *B23K 2203/16* (2013.01); *B29C 65/04* (2013.01); *B29C 65/08* (2013.01); *B29C 65/18* (2013.01); *B29C 66/961* (2013.01); *B29L 2031/747* (2013.01); *B41P 2219/33* (2013.01); *B41P 2219/43* (2013.01)

(56) References Cited

U.S. PATENT DOCUMENTS

| | | | |
|---|---|---|---|
| 4,896,811 A | | 1/1990 | Dunn et al. |
| 4,906,316 A | | 3/1990 | Seidl |
| 5,222,648 A | * | 6/1993 | Takano ................ 228/5.5 |
| 6,019,154 A | | 2/2000 | Ma et al. |
| 6,047,875 A | * | 4/2000 | Al-Nabulsi ............ 228/5.5 |
| 2009/0008022 A1 | * | 1/2009 | Kiessling ............... 156/73.1 |

* cited by examiner

JOINING DEVICE FOR JOINING TWO WORKPIECES HAVING EITHER A PIVOTABLE STAMP OR A PIVOTABLE SUPPORTING TABLE

This application claims priority based on an International Application filed under the Patent Cooperation Treaty, PCT/EP2010/003694, filed on Jun. 18, 2010 and German Application No. DE 102009030115.1-45, filed on Jun. 22, 2009.

BACKGROUND OF THE INVENTION

The invention concerns a joining device for joining two workpieces comprising a stamp which can be moved up and down between a lower working position and an upper loading position, wherein a first workpiece and a second workpiece arranged under the first workpiece can be arranged between the stamp and the support table.

Joining devices of that kind include for example stroke embossing devices for the hot embossing of substrates, that is to say the at least partial application of a transfer layer of a hot embossing film to a substrate by means of the action of pressure and heat on the hot embossing film which rests on the substrate. In the stroke embossing method a hot embossing film is transferred onto the substrate by a heated embossing stamp of metal or silicone in a continuous up and down movement. In that case the form of the embossing stamp determines the shape of the embossing. The stroke embossing procedure is suitable inter alia for sharp-edged, positionally accurate application of individual hologram images or also for sharp-edged stamping out of and application of motifs with partial surface coverage.

It can advantageously be provided that the embossing force is locally varied in dependence on the configuration of the transfer layer to be transferred from the hot embossing film onto the substrate, in particular by virtue of locally different coverage on the part of the transfer layer. Different local embossing forces are possible for example by region-wise shims or by adjusting screws which make it possible to slightly tip an embossing head or a support table for the substrate to be embossed upon and thus to set different local embossing forces. A disadvantage is that the adjustment operation generally has to be effected manually directly at the embossing device in the immediate proximity of the heated embossing stamp and this is a tedious process because the local embossing forces cannot be directly measured and/or cannot be understood or can be only inadequately accurately understood and high apparatus conversion times are involved.

In addition the above-mentioned joining devices can include ultrasound and high frequency welding devices which are used for example to weld two workpieces of plastic together, such as for example automobile headlight housings or other multi-part plastic housings to be welded.

SUMMARY OF THE INVENTION

The object of the present invention is to provide an improved joining device.

According to the invention that object is attained by a joining device for joining two workpieces comprising a stamp which can be moved up and down between a lower working position and an upper loading position, wherein a first workpiece and a second workpiece arranged under the first workpiece can be arranged between the stamp and the support table, wherein it is provided that the support table is mounted pivotably about two pivot axes which are perpendicular to each other and which are perpendicular to the axis of movement of the stamp and is pivotable by means of adjusting devices about the two pivot axes, wherein the stamp forms a rigid support in the working position, or the stamp is mounted pivotably about two pivot axes which are perpendicular to each other and which are perpendicular to the axis of movement of the stamp and is pivotable by means of adjusting devices about the two pivot axes, wherein the support table forms a rigid support in the working position.

The device according to the invention affords the advantage of directly setting adjusting forces or local joining forces and thus simplifying and reducing the time involved in the set-up work on the joining device. There is therefore no need to use adjusting screws which are displaced by hand or manually to implement an inclined position which increases the joining pressure at the raised location. A further advantage is that the adjusting forces are adjustable during operation and remotely. There is no longer a risk of injury by manipulating the stamp. Long experimenting and trial-and-error testing procedures are to be avoided, the set values can be directly read off and reproduced at any time.

The stamp can be moved up and down substantially perpendicularly to the support table. For example a right-angled x-y-z coordinate system can be used to describe the stroke movement, in which the stroke movement takes place on the z-axis and the coordinates of the support table can be described by the x- and y-coordinates.

It can be provided that the first workpiece is a hot embossing film, wherein the hot embossing film has at least a transfer layer and a carrier film, the second workpiece is a substrate to be embossed upon with at least one portion of the transfer layer and the stamp is a heated embossing stamp. Such joining devices which are known as hot embossing devices are used to decorate substrates which are of a flat shape or three-dimensional, wherein the transfer layer of the hot embossing film adheres to the substrate after the joining or embossing operation and the carrier film is then pulled off. When the carrier film is being pulled off the remaining portions of the transfer layer, which have not been transferred, are also pulled off.

It can further be provided that the stamp is a sonotrode. The sonotrode emits ultrasonic waves which weld the first and second workpieces together. The welding operation is promoted by the additional build up of pressure between the sonotrode and the support table.

It can further be provided that the stamp is a high frequency welding head. High frequency welding is preferably used for joining workpieces of plastic. Thus for example automobile headlight housings can comprise two housing halves which are joined together by high frequency welding.

There can be provided four adjusting devices arranged in a preferably right-angled quadrangle, wherein a joint pivotable about two mutually perpendicular axes is arranged in a region having the point of intersection of the diagonals of the quadrangle. The joint can preferably be a ball joint. If the above-described coordinate association is used then the two mutually perpendicular axes are the x- and the y-axis.

Alternatively however there can also be provided three adjusting devices arranged in a preferably isosceles triangle, wherein the joint pivotable about two mutually perpendicular axes is arranged in a region having the center point of the triangle. The joint can preferably be a ball joint.

The adjusting devices can be in the form of pneumatic or hydraulic adjusting devices, for example pneumatic or hydraulic cylinders. The adjusting devices can be directly acting but they can also be coupled to transmission arrangements to achieve for example particularly sensitive adjustment.

In a preferred embodiment it can be provided that the adjusting device is a bellows cylinder.

In addition the adjusting devices can be in the form of electromechanical adjusting devices. Thus an electromechanical adjusting device can be formed for example from an electric motor and a self-locking transmission arrangement. The transmission arrangement can be for example a worm transmission in which an adjusting motor drives a screw spindle which drives a rotationally fixed nut. The electric motor can advantageously be a stepping motor so that reproducible setting of the adjusting device is possible in a particularly easy way.

It can further be provided that the device cooperating with the adjusting devices has a rotation preventing means. The above-mentioned device can be the support table or the stamp plate of the stamp. The rotation preventing means can be formed for example by lateral guides of a square or rectangular plate. It is however also possible to provide a round plate and for the rotation preventing means to be formed by one or more pin or pins or the like which engage into a groove-shaped recess in the circular plate. The circular plate can also have a straight tangential portion cooperating with a straight abutment. In addition the circular plate can be a plate of a geometrically exact circular contour, but also a plate involving an elliptical contour or a contour of any curved shape.

It can further be provided that the device cooperating with the adjusting devices has an abutment for limiting the adjusting travels of the adjusting devices. That abutment is advantageous in particular when the adjusting device is continuously acted upon by force, which can apply in particular in regard to pneumatic and hydraulic adjusting devices. If the device cooperating with the adjusting devices is for example the support table, then the support table could assume a position outside the intended range of displacement if the stamp is not in direct or indirect contact with the support table, that is to say it is outside the joining position.

It can be provided that the abutment is in the form of an adjustable abutment.

It can further be provided that the device forming the rigid support is adjustable pivotably about two pivot axes which are perpendicular to each other and perpendicular to the axis of movement of the stamp. In that respect for example this can involve the heated embossing stamp of a joining device which is in the form of a hot embossing device, in particular the embossing plate of the embossing stamp.

In an advantageous configuration it can be provided that the device forming the rigid support is pivotably adjustable by means of adjusting screws. As described hereinbefore therefore it can be provided for example that the embossing plate of the embossing stamp is adjustable by means of adjusting screws.

It can also be provided that the device forming the rigid support is pivotably adjustable by means of shims. The shims can be for example small metal plates of differing thickness, which can be inserted for example between the underside of the embossing plate and the top side of the embossing plate receiving means.

It can further be provided that a receiving means for the substrate is arranged on the support table.

In the case of joining devices in the form of a hot embossing device, it can be provided that the device has a storage and transport device for the hot embossing film. The hot embossing film can be provided for example on a storage roll and the carrier layer which is pulled off after the embossing operation can be wound on to a take-up roll. For exact positioning of the hot embossing film the film can have for example optical markings which are detected by optical sensors cooperating with a control device of the transport device.

It can further be provided that the control devices have sensors for determining the adjusting force and/or have a calibrated characteristic curve in respect of the dependency of the adjusting force on the input value of the adjusting device. It can therefore be provided that the adjusting device at the same time performs the function of a force sensor. In the case of a pneumatic or hydraulic adjusting cylinder for example the adjusting force can be determined as the quotient of the cylinder pressure and the piston area.

It can further be provided that the adjusting devices are connected to a control device for measuring and/or setting the adjusting force.

Preferably the device cooperating with the adjusting devices can involve a flexurally stiff plate. It can however also be provided that the plate twists under load or elastically deforms in the direction of the adjusting force.

BRIEF DESCRIPTION OF THE DRAWINGS

The invention will now be described in greater detail by means of embodiments by way of example. In the drawing.

DETAILED DESCRIPTION OF THE INVENTION

Figure 1:
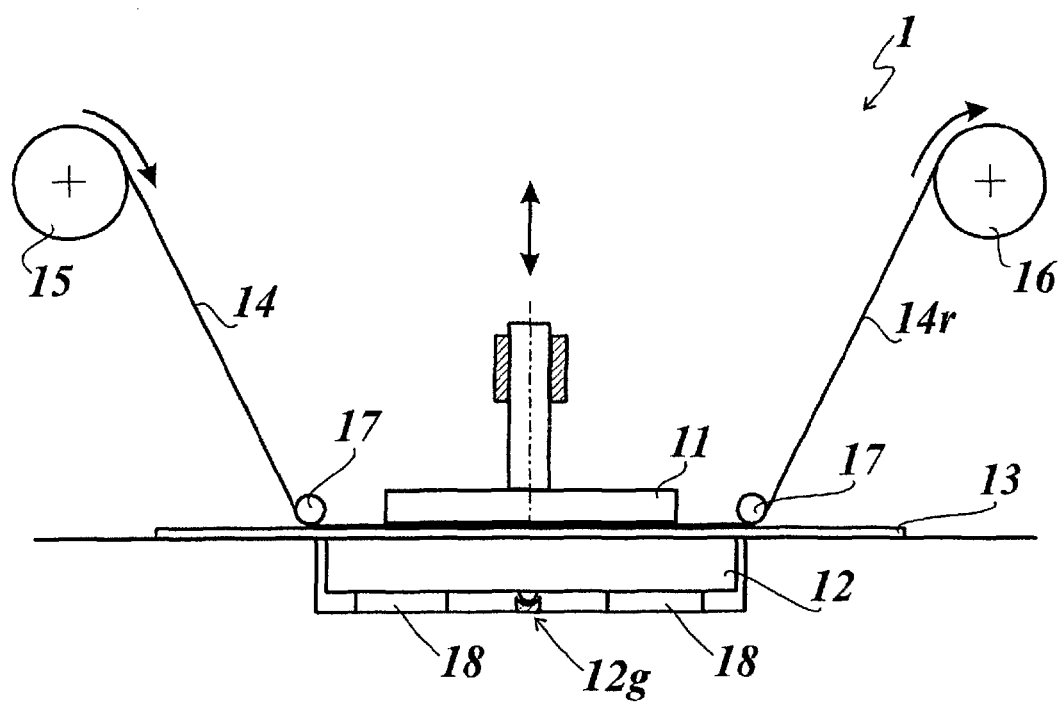
FIG. 1 shows a diagrammatic view of a joining device according to the invention.

FIG. 1 shows a joining device in the form of a stroke embossing device 1 for the hot embossing of films. In the stroke embossing method the transfer layer of a hot embossing film is transferred onto the substrate by a heated embossing stamp of metal or silicone or of metal with a silicone coating in a continuous up and down movement. In that case the shape of the embossing stamp determines the form of the embossing applied. The stroke embossing method is suitable inter alia for sharp-edged and positionally accurate application of individual hologram images to substrates to be decorated such as for example packagings or products.

The stroke embossing device 1 has a heated embossing stamp 11 which is movable up and down and a support table 12 cooperating with the embossing stamp 11 wherein a substrate 13 to be coated and a hot embossing film 14 are arranged between the stamp 11 and the support table 12. A supply roll 15, a take-up roll 16 and direction-changing rolls 17 form a storage and transport device for the hot embossing film 14, while the means for feeding and positioning the hot embossing film 14 are not shown in greater detail in the FIG. 1 embodiment. Equally the means for feeding and positioning the substrate 13 are also not shown in greater detail.

The stroke embossing device 1 has means for orienting the hot embossing film 14 and the substrate 13 relative to each other in such a way that a decoration element arranged on the hot embossing film 14 is preferably arranged in accurate register relationship over a region intended for same on the substrate 13 and then, as described hereinafter, is transferred onto the substrate 13. For example those means can provide that one or more register marks are arranged on the hot embossing film 14 per decoration element, the register marks being detected with an in particular optical sensor. In that arrangement the sensor can be arranged in fixed connection to the hot embossing device 1 and by means of register marks on the hot embossing film 14 detects the register-accurate position thereof relative to the workpiece to be decorated in the stroke embossing device 1.

After the embossing operation, what remains is a residual film 14r which substantially comprises the carrier layer, pulled off the transfer layer, of the hot embossing film 14, and which is wound onto the take-up roll 16.

The support table 12 is supported on adjusting devices 18 which for example can be in the form of hydraulic or pneumatic adjusting devices or in the form of electromechanical adjusting devices. When cooperating with the embossing stamp 11 the adjusting devices 18 produce an embossing force equal to the total of the adjusting forces of the adjusting devices 18. The adjusting forces of the adjusting devices 18 can be set separately so that the embossing force can be locally set and the surface regions of the decoration element which are to be applied by embossing can be acted upon with a differing embossing force. Different local embossing forces are desired for example to compensate for irregular surface coverage of the decoration element. In comparison with the conventional method of slightly inclinedly setting the support table 12 by means of adjusting screws or shims in order indirectly to set locally different embossing forces as a consequence of the application pressure geometry, the device according to the invention affords the advantage of directly setting adjusting forces or local embossing forces. A further advantage is that the adjusting forces are adjustable during operation and remotely. There is no longer a risk of injury by virtue of manipulation at the heated embossing stamp. A long trial-and-error testing procedure is avoided and the set values can be reproduced at any time.

The support table 12 can be disposed inclinedly when the adjusting forces of the individual adjusting devices 18 are set at different values. Abutments 19a limit that inclined positioning to a maximum value which is about 4 mm in the preferred embodiment shown in the Figures.

In regard to possible inclined positioning of the support table 12 and different adjusting forces set at the individual adjusting devices 18, different situations can arise.

If the substrate 13 is for example a flat portion which rests on the support table 12 and has a surface to be embossed upon, which extends parallel to the surface of the support table 12, no inclined positioning of the support table 12 will happen when embossing the substrate 13 because different adjusting forces set at the individual adjusting devices 18 only lead to different embossing pressures in the respective surface regions in the area around the adjusting devices 18. That can be advantageous if the motif to be embossed requires that. For example individual regions of the motif may involve only a small area to be embossed, which requires a low embossing pressure, while other regions involve a large area to be embossed, which requires a higher embossing pressure. In that case of a substrate surface to be embossed, which extends parallel to the surface of the support table 12, deliberate inclined positioning of the support table 12, with the embossing stamp 11 not yet bearing thereagainst as a fixed counter-support, may be appropriate to provide that the embossing stamp 11 is not applied in plane-parallel relationship, but so that the embossing stamp 11 is applied to or rolls on the surface to be embossed, in portion-wise manner, in order to avoid air inclusions in the surface to be embossed upon and to reduce the respective locally required embossing force. For that purpose the embossing stamp 11 can preferably be of a slightly curved configuration, similarly to a rocker stamp. In that way local air inclusions which occur can be avoided during the embossing operation or can be pressed out while they are occurring and the smaller local embossing area which is now involved means that a lower embossing force can act for the same necessary embossing pressure on the surface to be embossed upon. When the embossing stamp 11 is approaching for example two adjusting devices 18 can be controlled in such a way that an edge of the support table 12 is higher than an opposite edge. When the embossing stamp 11 which is in particular still performing the downward movement thereof in the direction of the support table 12 meets that higher region of the support table 12, the oppositely disposed two embossing cylinders 11 are now actuated in such a way that the entire support table 12 is now in the upper abutment position. In that way the entire substrate surface to be embossed upon is embossed, with the embossing stamp 11 rolling constantly over the substrate surface. Depending on the respective manner of actuation of the embossing stamp 11 and the adjusting devices 18, the speed of the rolling movement and of the entire embossing operation can be suitably varied and adjusted. That embossing operation can be reproduced at any time by way of the specifically set values at the adjusting devices 18 which for that purpose are preferably actuated with proportional valves and a programmable logic control (PLC). Depending on the respective part geometry of the substrate 13, embossing stamps 11 which are curved, which are in the shape of a segment of a sphere or which are also irregularly shaped can be envisaged for the most widely varying part geometries of the substrate 13.

For the described rolling procedure for the embossing stamp 11, slight inclined positions of the support table are sufficient, which can be in the millimeter range or even in the tenth of a millimeter range. That corresponds to a few degrees deviation from the horizontal.

If the substrate 13 is a part with a three-dimensional surface geometry, which rests on the support table 12 and has a surface to be embossed upon, which does not extend parallel to the surface of the support table 12, the support table 12 can be put into a desired inclined position when embossing the substrate 13 because differently set adjusting forces of the individual adjusting devices 18, in cooperating with the fixed counter-support of the embossing stamp 11 which in particular is of a counterpart shape corresponding to the surface geometry of the substrate 13 and which bears on the surface of the substrate 13, can produce an inclined positioning of the support table 12 corresponding to the three-dimensional geometry of the substrate 13. For such compensation of different surface geometries in respect of the substrate 13 by inter alia inclined positioning of the support table 12, inclined positions of the support table in the centimeter or also in the decimeter range, in conjunction with a sufficiently large support table 12 corresponding to the dimensions of the substrate 13, are appropriate and possible. That corresponds to a few degrees up to about between 10 and 20 degrees of deviation from the horizontal.

Figure 2:
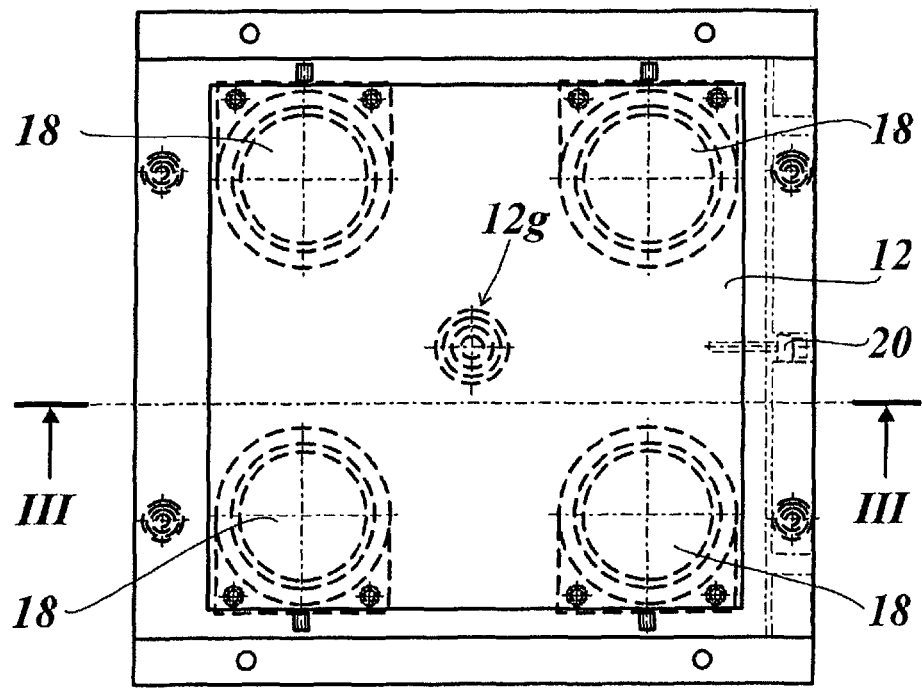
FIG. 2 shows a plan view of a first embodiment of a support table.
Figure 3:
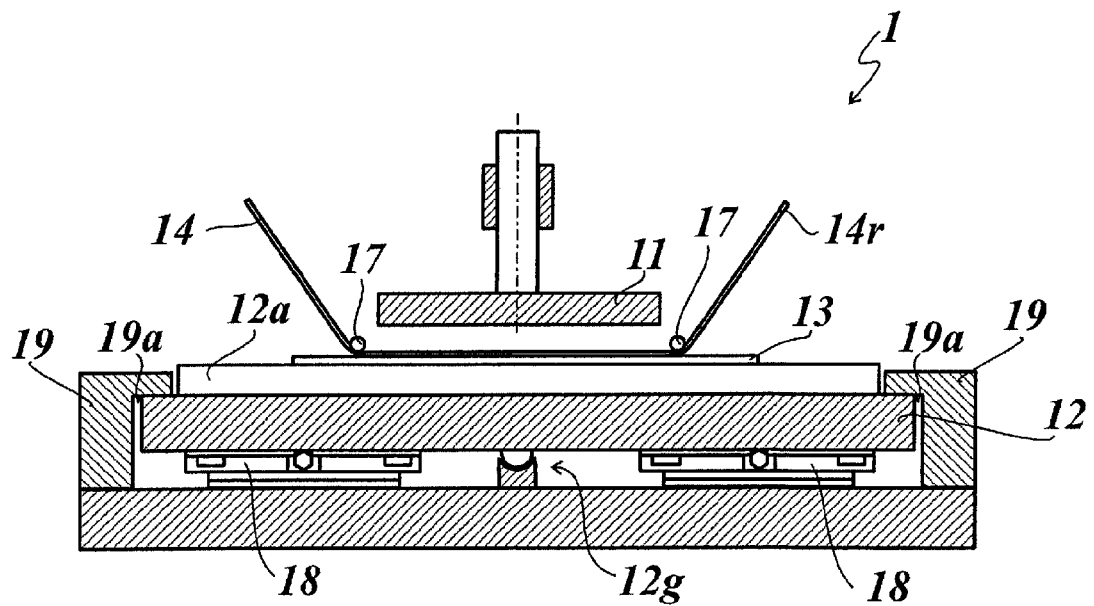
FIG. 3 shows a sectional view of the support table along section line III-III in FIG. 2 with the stamp moved upwardly.
Figure 4:
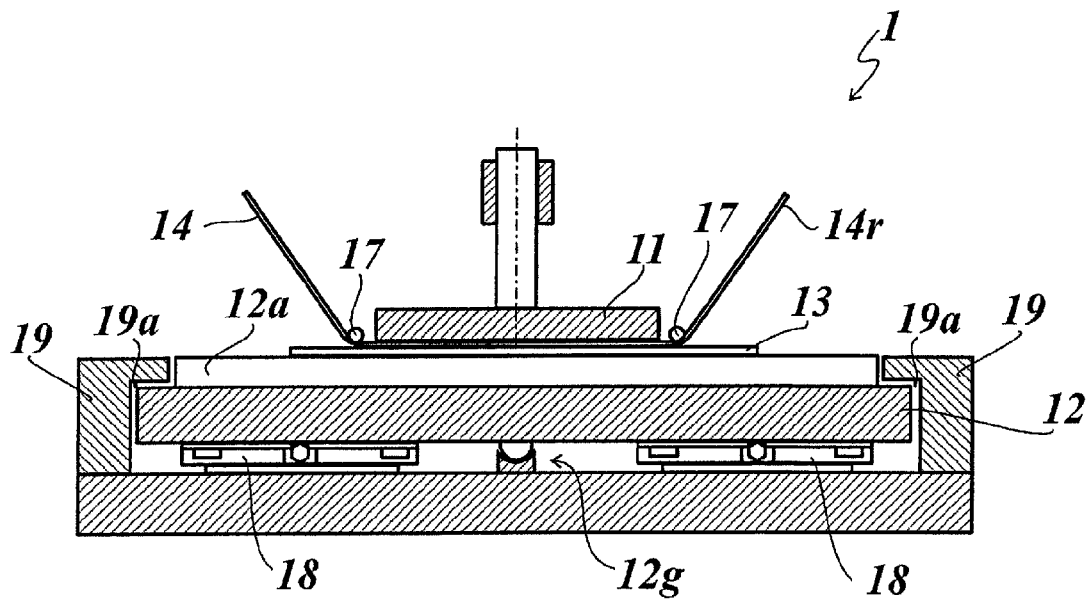
FIG. 4 shows a sectional view of the support table along section line III-III in FIG. 2 with the stamp moved downwardly.

FIGS. 2 through 4 now show a first embodiment of the support table.

As shown in FIG. 2 four adjusting devices 18 are arranged under the support table 12. The adjusting devices 18 are respectively arranged in the corner regions of the square support table 12 which, as can be seen in the sectional views in FIGS. 3 and 4, is adjustable in height by means of the adjusting devices 18 along the lateral guides 19. In a preferred embodiment the adjusting devices 18 are in the form of pneumatic adjusting devices with a bellows cylinder, wherein the pneumatic pressure fed to the adjusting devices 18 is in the range of between 0.1 and 10 bars. The cross-sectional area of the bellows cylinder is so selected that, for each bellows cylinder, for example with a diameter for the bellows cylinder of about 63 mm, an adjusting force in the range of between 30 and 2000 N is applied. Accordingly the embossing force, that is to say the total of the adjusting forces of the four adjusting devices 18, is in the range of between 120 and 8000 N. The variation in the embossing force in different regions of the support table is about ±100%.

A further increase in the adjusting forces for each adjusting device 18 can be achieved by the adjusting forces of an adjusting device 18 acting on the support table 12 indirectly by way of a lever transmission. In that case the lever mechanism and the associated adjusting device 18 can be jointly arranged beneath the support table 12 or the adjusting device 18 and parts of the lever mechanism can be arranged beside the support table 12.

An increase in the adjusting travel of the adjusting device 18 can be achieved by a plurality of adjusting devices 18, for example pressure cylinders, being arranged in mutually superposed relationship, in which case the respective lower pressure cylinder moves upwardly the pressure cylinder disposed thereabove. That is effected in staggered relationship at each pressure cylinder until the uppermost pressure cylinder engages the support table 12.

The lateral guides 19 are of an L-shaped configuration in cross-section, wherein the inside, towards the support table 12, of the perpendicularly arranged one limb of the guide 19 forms a guide path for the support table 12 and the inside of the other limb, that is towards the top side of the support table 12, forms the abutment 19a. The support table 12 is further supported pivotably in two axis directions on a ball joint 12g, wherein the ball joint 12g is arranged at the point of intersection of connecting diagonals passing through the center points of the cylindrical adjusting devices 18 (see FIG. 2).

In the embodiment shown in FIGS. 3 and 4 the substrate 13 is deposited and fixed on a part receiving means 12a arranged on the support table 12. The inside contour of the part receiving means 12a is matched to the outside contour of the substrate 13 to be embossed upon so that the substrate 13 is securely fixed in position without additional means. It can however also be provided, as shown hereinbefore in FIG. 1, that the substrate 13 is fed by way of a transport device, in which case the transport device can at the same time position and fix the substrate 13. The substrate 13 can be for example a substrate in strip form or substrates which are arranged one after the other and which are fed and discharged on a conveyor belt. The substrate can be for example paper, card or cardboard or plastic material, for example ABS, PP, PET or the like. The substrate 13 can also involve metal, in particular with or without further layers applied thereto (for example lacquer, bonding agent, adhesive).

FIG. 3 shows that the maximum height adjustment of the support table 12 in the case of the upwardly moved embossing stamp 11 is limited by the abutments 19a.

When the embossing stamp 11 is moved downwardly, that is to say in the working position of the embossing stamp 11, the embossing stamp 11 delimits the maximum height adjustment of the support table 12. As a consequence thereof the support table 12 bears by way of the receiving means 12a, the substrate 13 parallel to the surface of the support table 12 and the hot embossing film 14, against the underside of the embossing stamp 11 which is also parallel to the surface of the support table 12 and the surface of the substrate 13 arranged thereon, when the adjusting devices 18 are actuated. The adjusting devices 18 now exert adjusting forces, with embossing forces of equal magnitude being directed in opposite relationship thereto. Consequently in the illustrated embodiment actuation of the adjusting devices 18 does not lead to inclined positioning of the support table 12, as described hereinbefore, unless the embossing stamp 11 has an elastic coating thereon, for example a silicone coating.

Figure 5:
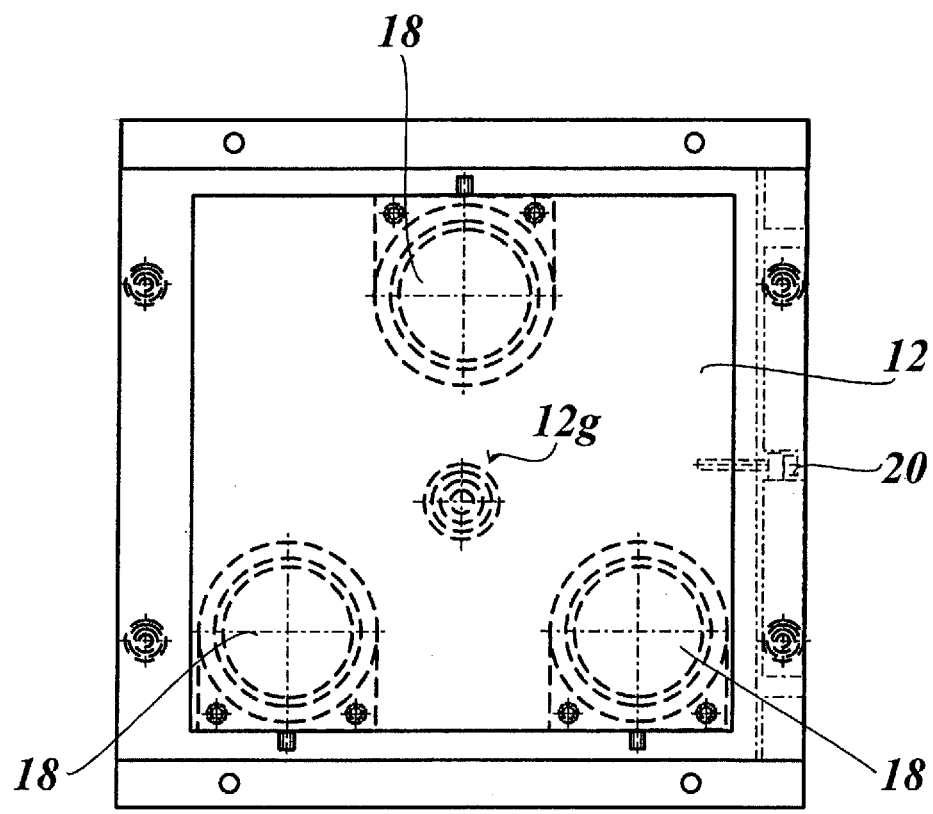
FIG. 5 shows a plan view of a second embodiment of a support table.

FIG. 5 shows a second embodiment which corresponds to the embodiment described with reference to FIG. 2, with the difference that, instead of four adjusting devices 18, there are only three adjusting devices 18 arranged in an equilateral triangle. The ball joint 12g is arranged at the center of the triangle.

FIGS. 1 and 5 show in broken line a rotational abutment 20 which prevents rotation of the support table 12 and which is arranged in the region of the peripherally extending guide 19. The tolerance of the rotational abutment 20 is so set that the outside edges of the support table 12 are prevented from contacting the peripherally extending guide 19. The rotational abutment 20 can be provided only at one side of the device 1, at two opposite sides or also at all sides of the device 1.

An alternative application of the stroke embossing device according to the invention is ultrasound or high frequency welding. In that case preferably a sonotrode forms a fixed counter-support to the displaceably mounted support table. The substrate, for example a two-part plastic component to be welded such as for example an automobile headlight housing with a front and a rear portion, is mounted in a part receiving means on the support table. The sonotrode and the part receiving means are shaped to correspond to the in particular peripherally extending weld seam. Depending on the part geometry in the region of the weld seam and the shaping of the sonotrode possibly respectively different or identical adjusting forces are now produced by means of the adjusting devices and the welding operation is carried out. An example of pressure actuation of the individual adjusting devices, in this case pneumatic pressure cylinders, for a predetermined substrate which however is not shown in greater detail: adjusting device I:4 bars, adjusting device II:3 bars, adjusting device III:2 bars, adjusting device IV:1 bar. The pressures employed therefore range in this example between 1 and about 10 bars, but depending on the respective size of the substrate and other boundary conditions of the method, can also be higher, for example between 1 and about 1000 bars. In that respect it may be advantageous if the adjusting forces of the adjusting devices are not constant in respect of time during the welding process but are varied dynamically, preferably quickly dynamically.

In a preferred variant the adjusting forces are respectively set at the beginning to a mean value. Thereafter the pressure for each adjusting device is increased by means of proportional valves and a control means, in particular in an interval of about 0.1 s, by about 1 bar, and then reduced again to the mean preset value. Those pulsating adjusting forces provide that the welding process can be effectively assisted and the quality of the weld can be improved.

FIGS. 6 through 9 now show a third embodiment of the joining device according to the invention, which clearly illustrates the conditions at a flat substrate to be embossed upon, in which the support table is not involved in inclined positioning when embossing the substrate 13 because differently set adjusting forces for the individual adjusting devices 18 only lead to different embossing pressures in the respective surface regions in the area around the adjusting devices 18.

Figure 6:
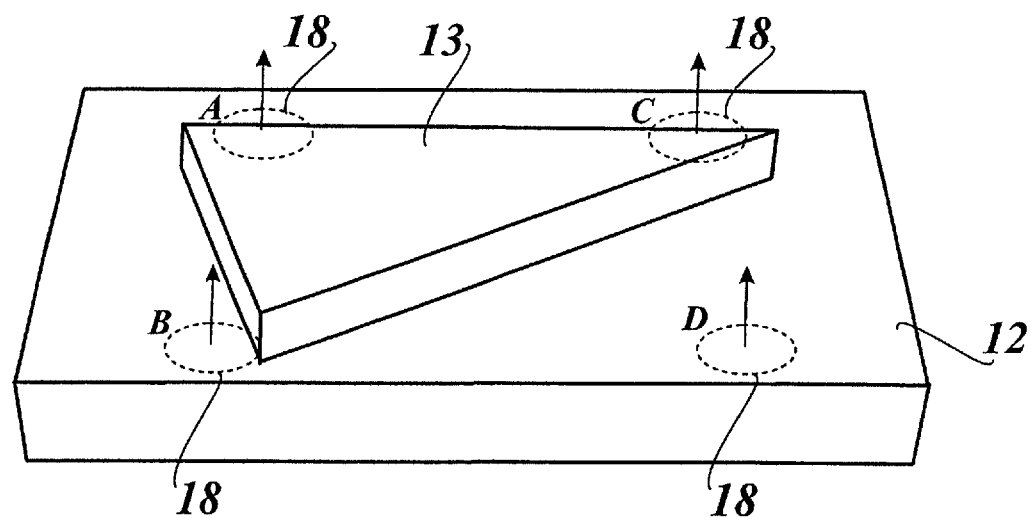
FIG. 6 shows a diagrammatic perspective view of a third embodiment.

FIG. 6 diagrammatically shows a substrate 13 which is in the form of a triangular plate and which is arranged on a support table 12 with four adjusting devices 18. The adjusting devices 18 are denoted by A through D. The adjusting forces emanating from the adjusting devices are symbolically represented by directional arrows. The configuration of the motif to be embossed, in the form of a triangle, means that there is a motif with differing surface coverage and thus with different required embossing forces. A large area is present at the wide part of the triangle and thus a high embossing pressure is necessary. At the pointed side of the triangle, there are small areas and a low embossing pressure is necessary.

Figure 7:
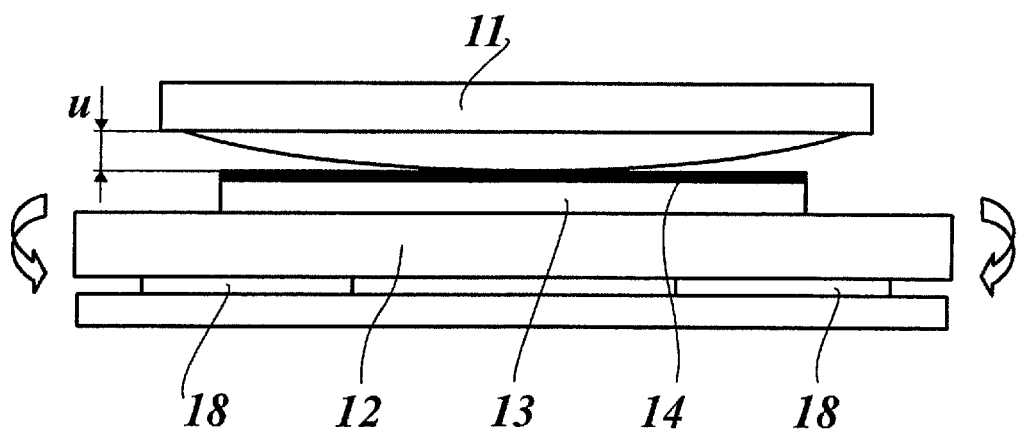
FIG. 7 shows a diagrammatic front view of the FIG. 6 device.
Figure 8:
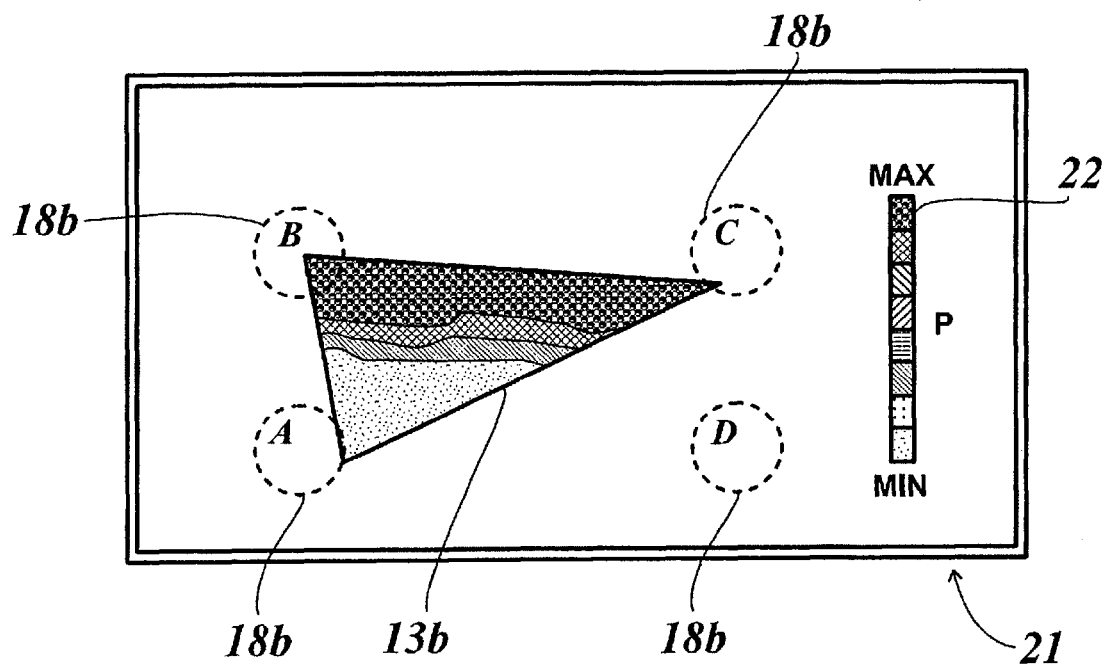
FIG. 8 shows a display screen view of a control portion.
Figure 9:
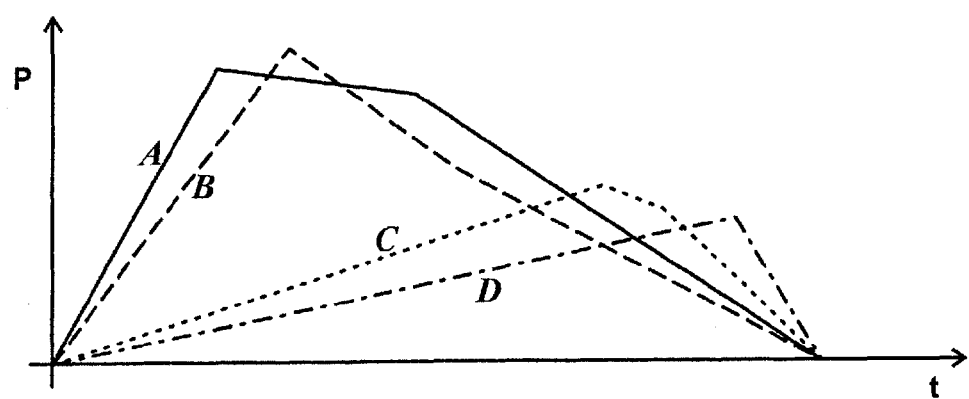
FIG. 9 shows a pressure-time graph for the FIG. 6 device.

As shown in FIG. 7 the embossing stamp 11 has a curved embossing surface which can be in the shape of a segment of a ball or a cylinder. The camber identified by u in FIG. 7 can be between 0.5 and 2 mm depending on the respective stamp surface.

For embossing the substrate 13 actuation of the four adjusting devices 18 is implemented by means of a programmable logic control (PLC) (not shown) and is graphically displayed on a display screen 21. Shown on the display screen 21 are images 18*b* of the adjusting devices, an image 13*b* of the substrate and a pressure scale 22, in the form of a bar chart, for the embossing pressure P. The embossing pressures P occurring at the substrate 13 are shown on the image 18*b* of the substrate in different colors which are predetermined on the pressure scale 22. The different colors are symbolized in FIG. 8 by different hatchings.

An operator of the embossing device can set the embossing pressures which are required region-wise at the substrate 13 by manual coloring of the embossing surface by means of an input interface (not shown). In accordance with that presetting on the part of the operator the four adjusting devices 18 identified by A through D are controlled by the PLC in such a way that the pressure distribution shown in FIG. 8 occurs.

A further advantageous effect occurs when the embossing stamp 11, as shown in FIG. 7, has a curved embossing surface and a rolling movement is performed in the embossing operation. In that way air inclusions between the hot embossing film 14 and the substrate 13 can be effectively avoided. The rolling movement of the embossing stamp 11 is achieved by a time-dependent variation in the embossing pressures produced by the four adjusting devices 18, as shown for example in FIG. 9. In the ideal situation a line-shaped contact is produced between the embossing stamp 11 and the embossing surface, in which case that line-shaped contact is moved over the embossing region and air inclusions between the hot embossing film 14 to be embossed and the surface of the substrate 13, that is to be embossed upon, are pressed out.

LIST OF REFERENCES

1 stroke embossing device
11 embossing stamp
12 support table
12*a* part receiving means
12*g* ball joint
13 substrate
13*b* image of the substrate
14 hot embossing film
14*r* residual film
15 storage roll
16 take-up roll
17 direction-changing roll
18 adjusting device
18*b* image of the adjusting device
19 guide
19*a* abutment
20 rotational abutment
21 display screen
22 pressure scale

The invention claimed is:

1. A joining device for joining two workpieces comprising a stamp which can be moved up and down between a lower working position and an upper loading position, wherein a first workpiece and a second workpiece arranged under the first workpiece can be arranged between the stamp and the support table, and
   wherein the support table is mounted pivotably about two pivot axes which are perpendicular to each other and which are perpendicular to the axis of movement of the stamp and is pivotable by means of adjusting devices about the two pivot axes, wherein the stamp forms a rigid support in the working position, and
   wherein the adjusting forces are adjustable during operation and remotely, and
   wherein the stamp comprises a curved embossing surface.

2. A joining device as set forth in claim 1, wherein the first workpiece is a hot embossing film, and wherein the hot embossing film has at least a transfer layer and a carrier film, the second workpiece is a substrate to be embossed with at least one portion of the transfer layer and the stamp is a heated embossing stamp.

3. A joining device as set forth in claim 1, wherein the stamp is a sonotrode.

4. A joining device as set forth in claim 1, wherein the stamp is a high frequency welding head.

5. A joining device as set forth in one claim 1, wherein there are provided four adjusting devices arranged in a right-angled quadrangle, and wherein a joint pivotable about two mutually perpendicular axes is arranged in a region having the point of intersection of the diagonals of the quadrangle.

6. A joining device as set forth in claim 1, wherein there are provided three adjusting devices arranged in an isosceles triangle, and wherein the joint pivotable about two mutually perpendicular axes is arranged in a region having the center point of the triangle.

7. A joining device as set forth in claim 1, wherein the adjusting devices are in the form of pneumatic or hydraulic adjusting devices.

8. A joining device as set forth in claim 7, wherein the adjusting device is a bellows cylinder.

9. A joining device as set forth in claim 1, wherein the adjusting devices are in the form of electromechanical adjusting devices.

10. A joining device as set forth in claim 1, wherein the device cooperating with the adjusting devices has a rotation preventing means.

11. A joining device as set forth in claim 1, wherein the device cooperating with the adjusting devices has an abutment for limiting the adjusting travels of the adjusting devices.

12. A joining device as set forth in claim 11, wherein the abutment is in the form of an adjustable abutment.

13. A joining device as set forth in claim 1, wherein the device forming the rigid support is adjustable pivotably about two pivot axes which are perpendicular to each other and perpendicular to the axis of movement of the embossing stamp.

14. A joining device as set forth in claim 13, wherein the device forming the rigid support is adjustable pivotably by means of adjusting screws.

15. A joining device as set forth in claim 13, wherein the device forming the rigid support is adjustable pivotably by means of shims.

16. A joining device as set forth in claim 1, wherein a receiving means for the substrate is arranged on the support table.

17. A joining device as set forth in claim 2, wherein the device has a storage and transport device for the hot embossing film.

18. A joining device as set forth in claim 1, wherein the adjusting devices have sensors for determining the adjusting force and/or have a calibrated characteristic curve in respect of the dependency of the adjusting force on the input parameter of the adjusting device.

19. A joining device as set forth in claim 1, wherein the adjusting devices are connected to a control device for measuring and/or setting the adjusting force.

* * * * *